(12) United States Patent
Larkin (10) Patent No.: US 8,038,104 B1
(45) Date of Patent: Oct. 18, 2011

(54) CABLE CONSTRAINING DEVICE FOR REDUCED CABLE WEAR

(75) Inventor: Kevin B. Larkin, Pebble Beach, CA (US)

(73) Assignee: Westek Electronics, Inc., Santa Cruz, CA (US)

(*) Notice: Subject to any disclaimer, the term of this patent is extended or adjusted under 35 U.S.C. 154(b) by 167 days.

(21) Appl. No.: 12/200,904

(22) Filed: Aug. 28, 2008

Related U.S. Application Data (63) Continuation-in-part of application No. 12/131,096, filed on Jun. 1, 2008, now Pat. No. 7,878,462.

(51) Int. Cl.
*F16L 3/16* (2006.01)

(52) U.S. Cl. .................. 248/55; 248/636; 248/74.2

(58) Field of Classification Search .......... 248/609, 248/635, 49, 55, 74.2, 74.3, 636
See application file for complete search history.

(56) References Cited

U.S. PATENT DOCUMENTS

| | | | | |
|---|---|---|---|---|
| 1,315,225 A | * | 9/1919 | Hughes | 248/68.1 |
| 2,399,899 A | * | 5/1946 | Tinnerman | 174/40 CC |
| 2,474,920 A | * | 7/1949 | Stearns | 248/49 |
| 2,891,749 A | * | 6/1959 | Heverly | 248/49 |
| 3,848,839 A | * | 11/1974 | Tillman | 248/74.2 |
| 4,705,244 A | * | 11/1987 | Saotome et al. | 248/68.1 |
| 4,896,465 A | * | 1/1990 | Rhodes et al. | 451/523 |
| 4,971,271 A | * | 11/1990 | Sularz | 248/68.1 |
| 5,257,768 A | * | 11/1993 | Juenemann et al. | 248/604 |
| 5,743,302 A | * | 4/1998 | McNeely | 138/113 |
| 5,828,005 A | * | 10/1998 | Huynh-Ba et al. | 174/92 |
| 5,947,158 A | * | 9/1999 | Gross et al. | 138/149 |
| 6,050,964 A | * | 4/2000 | Yates | 602/5 |
| 6,198,042 B1 | * | 3/2001 | Huston | 174/40 R |
| 6,241,199 B1 | * | 6/2001 | Ismert | 248/56 |
| 6,421,487 B1 | * | 7/2002 | Hutton et al. | 385/114 |
| 6,488,317 B1 | | 12/2002 | Daoud | 285/322 |
| 6,491,279 B1 | * | 12/2002 | Iwano | 248/635 |
| 6,604,715 B2 | * | 8/2003 | Howe | 248/62 |
| 6,732,982 B1 | * | 5/2004 | Messinger | 248/74.1 |
| 6,864,427 B2 | | 3/2005 | Radelet et al. | 174/93 |
| 6,875,496 B2 | * | 4/2005 | Roosen et al. | 428/194 |
| 6,960,380 B2 | * | 11/2005 | Buekers et al. | 428/40.1 |
| 7,202,418 B2 | * | 4/2007 | Glew | 174/113 C |

(Continued)

OTHER PUBLICATIONS

Office Action, U.S. Appl. No. 12/131,096, Apr. 14, 2010, 8 pages.

(Continued)

*Primary Examiner* — Terrell McKinnon
*Assistant Examiner* — Bradley H Duckworth
(74) *Attorney, Agent, or Firm* — Morgan, Lewis & Bockius LLP (57) ABSTRACT

A cable constraining device features a flexible cable contact sheet that is inward attached to a cable constraining contour of a holding structure. The holding structure is configured for substantially encompassing a cable circumference while in constraining configuration. In a cavity between the holding structure and the cable contact sheet is a gel filled that provides a vibration dampening soft contact of the cable contact sheet with the cable insulation. The cushioning gel absorbs micro movement of the cable transferred onto the cable contact sheet such that wearing effects due to frictional sliding and vibration of the cable at its constraining location is substantially reduced. The holding structure may be of rubber like material that is formed on its outside like a well known grommet. An outer rigid clamping structure may be additionally employed. The device may be also configured as a profile in various lengths and bent shapes.

18 Claims, 13 Drawing Sheets

U.S. PATENT DOCUMENTS

| | | | | |
|---|---|---|---|---|
| 7,284,730 B2* | 10/2007 | Walsh et al. | ................ | 248/74.3 |
| 7,534,965 B1* | 5/2009 | Thompson | ................ | 174/153 G |
| 2003/0218103 A1* | 11/2003 | Connors | ................ | 248/49 |
| 2005/0067548 A1* | 3/2005 | Inoue | ................ | 248/635 |
| 2007/0120022 A1* | 5/2007 | Trotter et al. | ................ | 248/49 |
| 2008/0254255 A1* | 10/2008 | Kao | ................ | 428/141 |

OTHER PUBLICATIONS

Notice of Allowance, U.S. Appl. No. 12/131,096, Sep. 22, 2010, 4 pages.

* cited by examiner

CABLE CONSTRAINING DEVICE FOR REDUCED CABLE WEAR

CONTINUATION IN PART

The present application is a Continuation in Part of US Parent Patent Application of the same title and inventor, application Ser. No. 12/131,096 filed 1 Jun. 2008 now U.S. Pat. No. 7,878,462.

FIELD OF INVENTION

The present invention relates to devices for constraining cables. In particular, the present invention relates to cable constraining devices utilizing an encapsulated gel cushion and/or encapsulated cushion profile for resiliently absorbing vibrations of the constrained cable.

BACKGROUND OF INVENTION

In engine driven vessels such as airplanes, helicopters, and the like, cables are exposed to tremendous vibrations that significantly contribute to the cables' wear particularly at their attachment locations. Cable wear in turn is a substantial factor in reducing the overall operational safety of such engine driven vessels. This is of particularly concern for aeronautic vessels that tend to stay in service for several decades. Cable wear is also difficult to monitor, since the cables are commonly stored away making their attachment locations inaccessible for inspection. Therefore, there exists a need for a cable constraining device that provides reduced cable wear. The present invention addresses this need.

Conventional cable constraining devices such as grommets and cable clips commonly employ a rubber like material encompassing the cable's insulation at the attachment location of that cable. The rubber is commonly employed to protect the cable insulation against surrounding sharp edges and/or hard materials that would damage the cable insulation in a short time. Nevertheless, the rubber itself likely rubs against the cable insulation causing both to wear, which eventually results in exposure of conductive cable core. Therefore, there exists a need for a cable constraining device that substantially avoids rubbing and eventual micro sliding between the cable insulation and the contacting portion of the cable constraining device. The present invention addresses also this need.

In engine powered vessels, cable trees have significantly varying cable numbers along individual cable tree branches. Therefore, there exists a need for cable constraining device, that may be economically fabricated in varying dimensions to accommodate for simultaneously clamping a highly diverse number of cables. The present invention addresses also this need. In addition, simultaneous clamping of a large number of cables in a single cable constraining device bears the risk of uneven clamping pressure distributions among the individual cables eventually resulting in excessive pressure on some cables. Therefore, there exists a need for a cable constraining device capable of simultaneously clamping a large number of cables with highly uniform clamping pressure. The present invention addresses also this need.

SUMMARY

In three embodiments of the invention, a cable constraining device features a flexible cable contact sheet that is inward attached to a sheet attachment interface of a positioning structure. The positioning structure is configured for substantially encompassing a cable circumference while in constraining configuration. In a pocket between the positioning structure and the cable contact sheet is a gel filled that provides a vibration dampening soft contact of the cable contact sheet with the cable insulation. The cushioning gel absorbs micro movement of the cable transferred onto the cable contact sheet such that wearing effects due to frictional sliding and vibration of the cable at its constraining location is substantially reduced. The positioning structure may be of rubber like material that is formed on its outside like a well known grommet.

The positioning structure may alternately be configured as a circumferentially tight able cable clip similar for example to a well known P-clamp. In such case, the positioning structure may include an outer rigid clamping structure attached at the outside of the rubber like material that is combined on its inside with the cable contact sheet. The cable contact sheet may be of a woven fabric and/or of thin rubber like material. The cable contact sheet is sufficiently thin to absorb micro movement of the constrained cable well within its elastic range as is well known in the art. The underlying gel acts at the same time to provide at the sufficient contact pressure of the cable contact sheet with the cable circumference.

In a fourth embodiment of the invention, the cable constraining device is configured as a multilayer profile with a stiff clamping profile having two clamping features at each end of it. A cushion profile extends adjacent to the clamping profile in between the two clamping features and is combined with the clamping profile via a positioning profile. The flexible contact sheet peripherally encompasses the cushion profile and withholds itself along at least a portion of peripheral faces of the positioning profile. The clamping profile is of a clamping stiffness and the positioning profile is of positioning softness and positioning height such that clamping forces applied to the clamping features are distributed along the cushion profile at least in a predetermined but preferably even fashion irrespective an elastic clamping deformation of the clamping profile between the two clamping features. Due to the overall extrusion type design, the multilayer profile may be economically fabricated, lengthened and/or bent into various lengths and shapes to accommodate for example for varying numbers of cables that may need to be simultaneously clamped.

DETAILED DESCRIPTION

Figure 1:
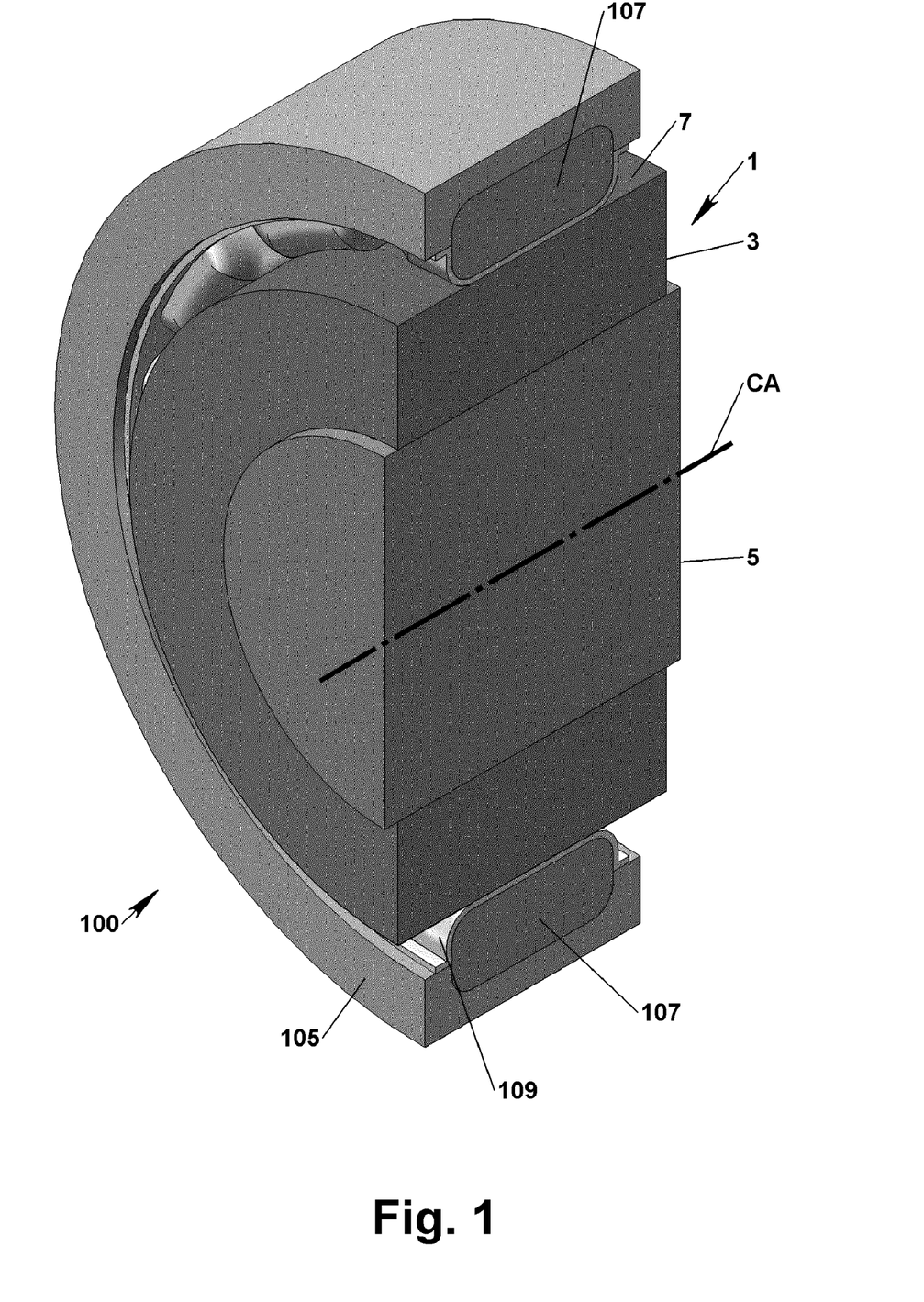
FIG. 1 is a first shaded perspective cut view of a cable portion constrained in a first embodiment of the invention. The cut plane is vertical and coinciding with cable axis CA.
Figure 2:
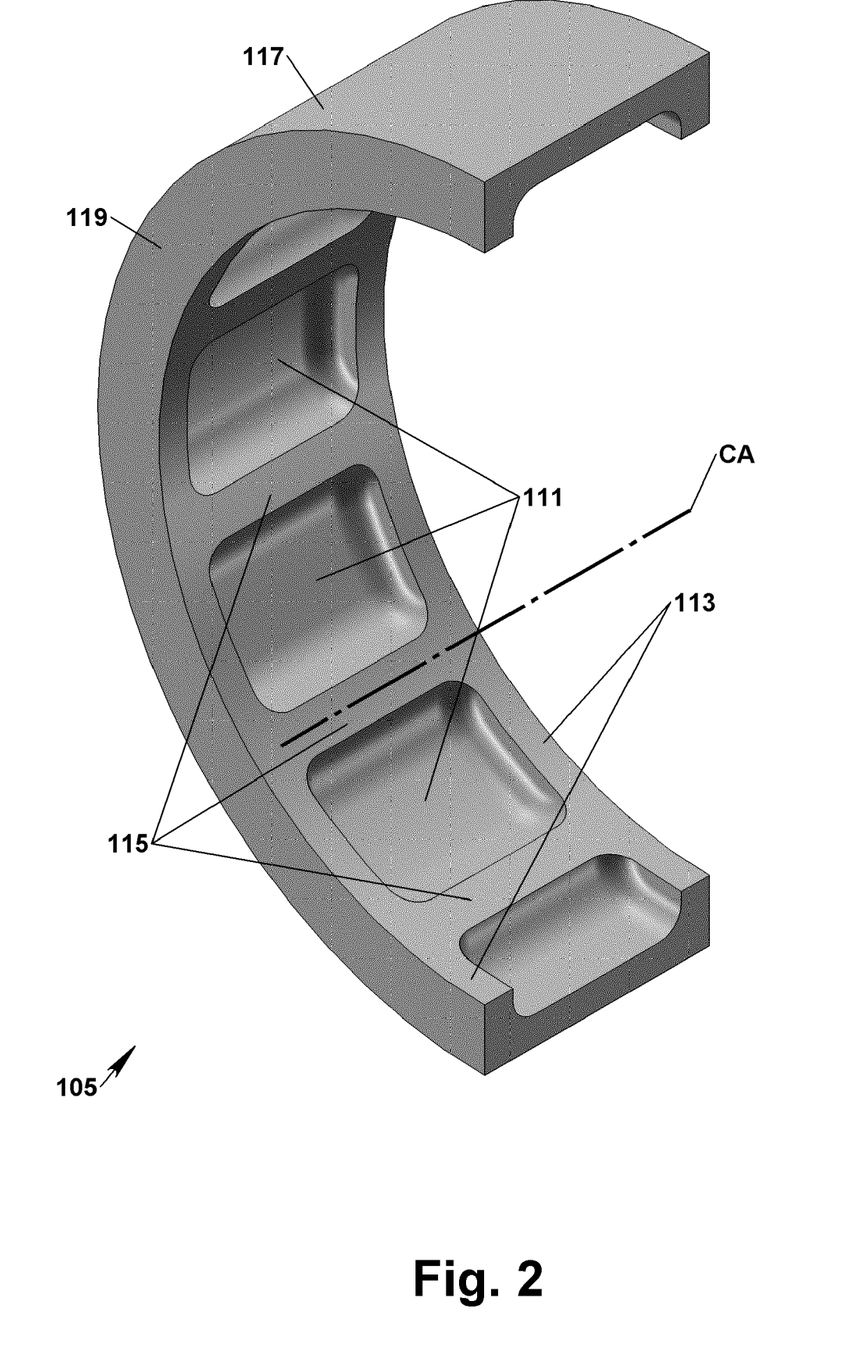
FIG. 2 is the first shaded perspective cut view of the positioning structure of FIG. 1.

Referring to FIG. 1, a prior art cable 1 may extend with its cable core 5 and cable insulation 3 along a cable axis CA. A cable circumference 7 may surround the cable axis CA. A cable constraining device 100 in accordance with a first embodiment of the invention may include a positioning structure 105, a flexible cable contact sheet 109 and a gel 107. Referring to FIG. 2, the positioning structure 105 may have a sheet attachment interface 113, 115 that is radially inward facing and substantially encompassing the cable circumference 7 while in a cable constraining configuration. The cable constraining configuration may be different from a fabrication configuration as explained in detail further below. Embedded in the sheet attachment interface may be one or more gel basins 111. Between the gel basins 111 may be a transverse seam 115 as a portion of the remaining sheet attachment interface 113, 115. Circumferential seams 113 are also portions of the sheet attachment interface 113, 115. The positioning structure 105 may feature an outer circumference 117 and axial faces 119 at both axial ends of it.

Figure 3:
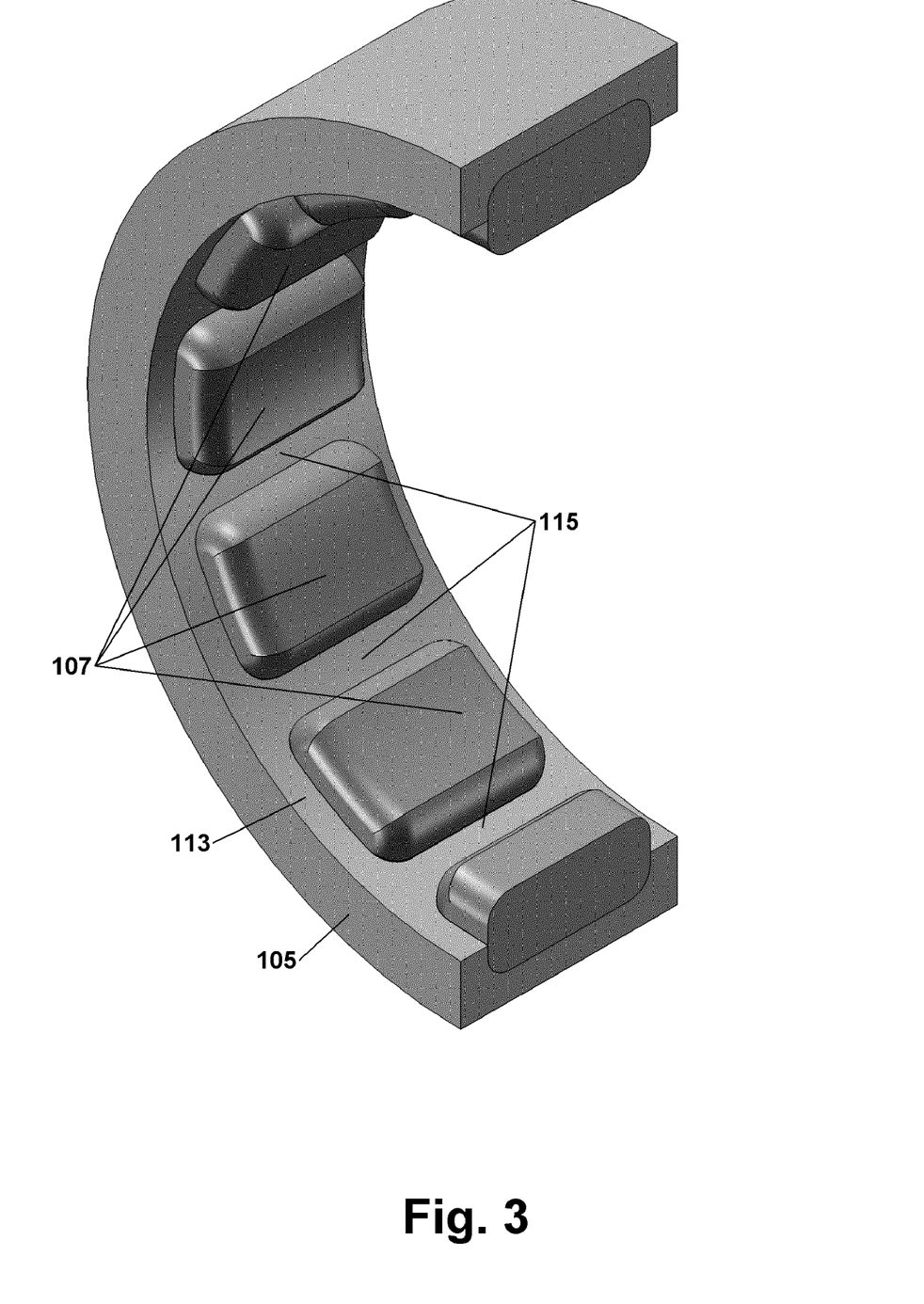
FIG. 3 is the first shaded perspective cut view of the positioning structure and gel of FIG. 1.
Figure 4:
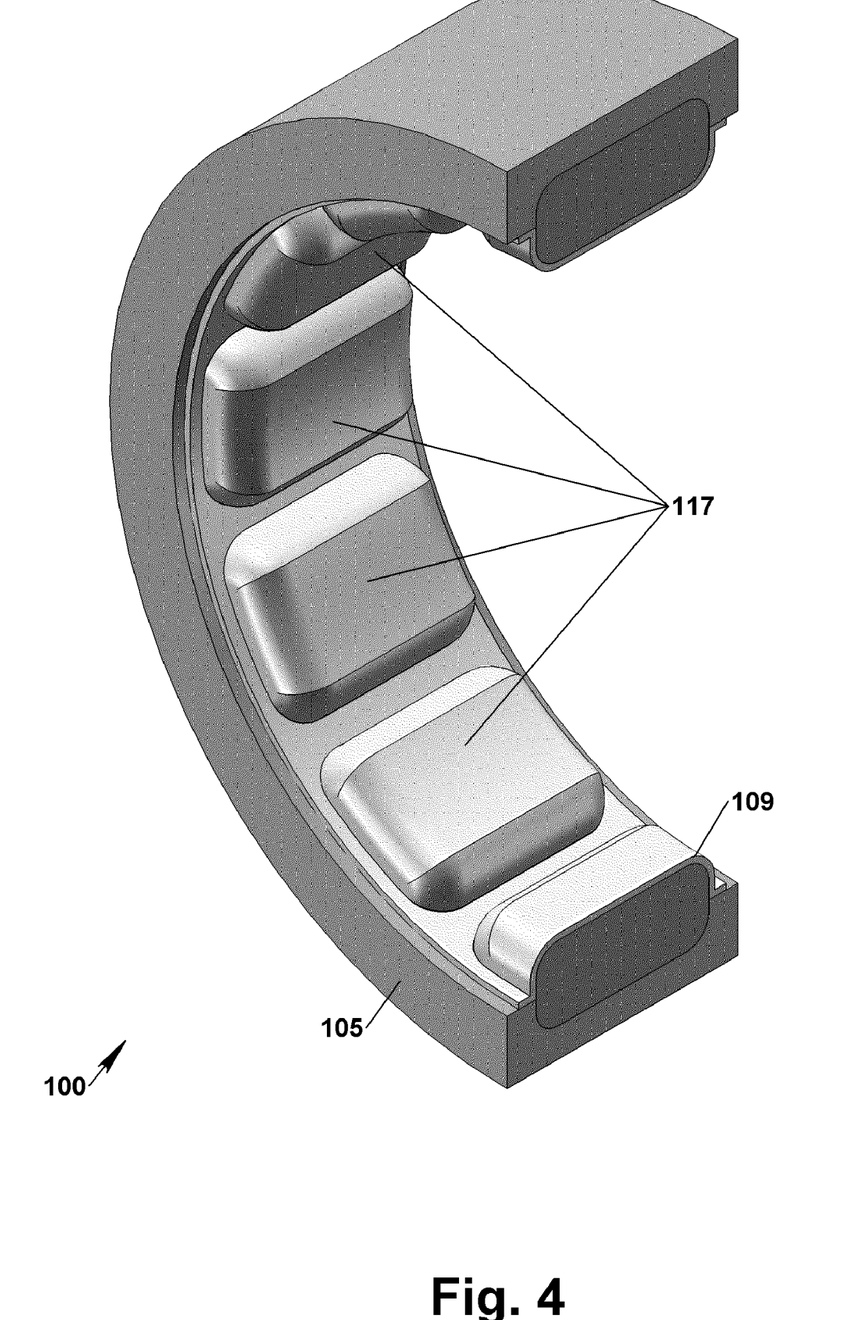
FIG. 4 is the first shaded perspective cut view of the positioning structure, gel and cable contact sheet of FIG. 1.
Figure 5:
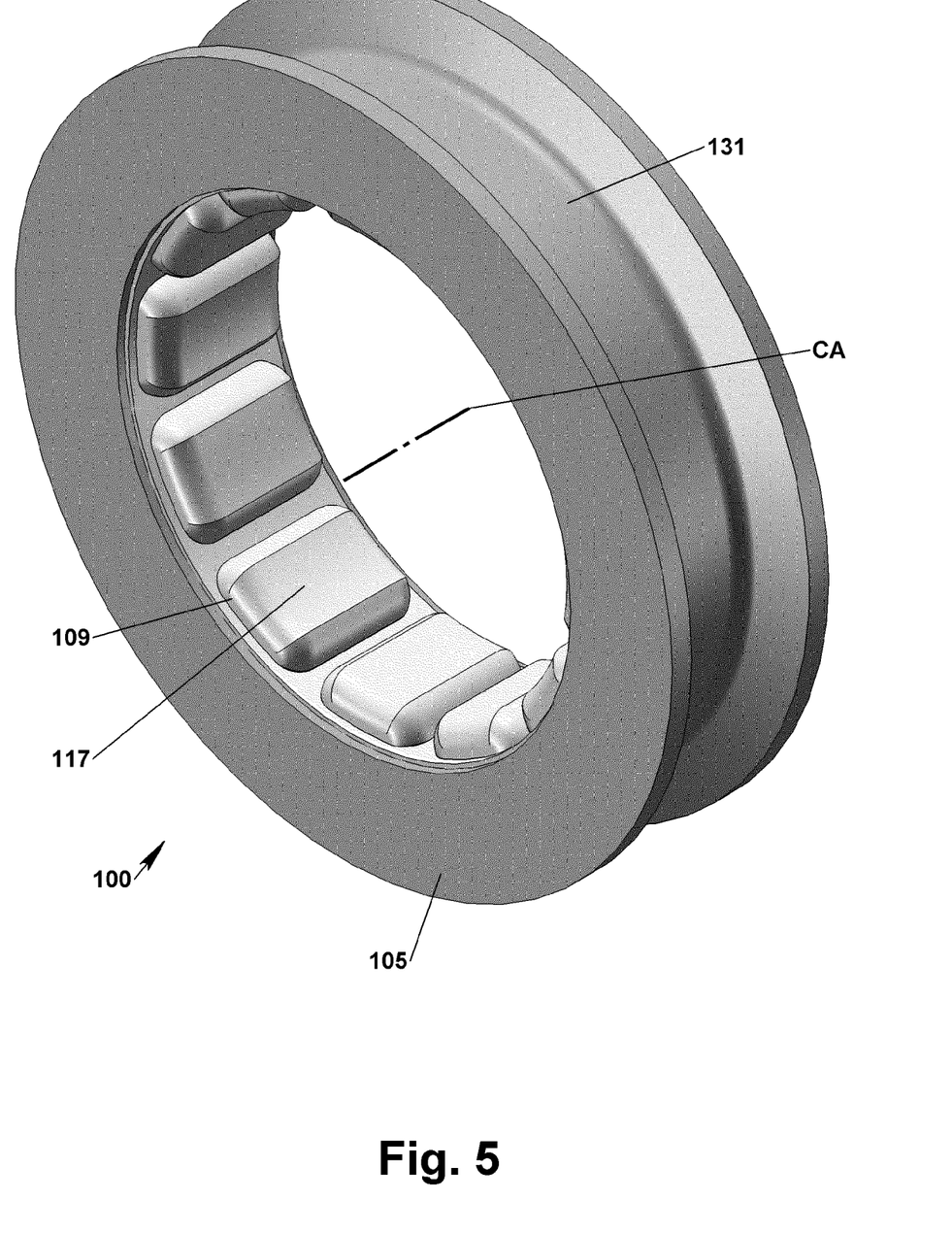
FIG. 5 is a second shaded perspective view of a second embodiment of the invention.

Referring to FIGS. 3 and 4, a flexible contact sheet 109 may be partially attached to the sheet attachment interface 113, 115 such that one or more pockets are defined in between the flexible contact sheet 109 and the sheet attachment interface 113, 115. In case of employed gel basin(s) 111, the pocket may be defined between the flexible contact sheet 109 and the respective gel basin 111. Separating the gel 107 into a number of small pockets may assist in avoiding long term creep and redistribution of the gel 107 as may be well appreciated by anyone skilled in the art. In the FIGS. 1-6, the transverse seams 115 are depicted as being substantially parallel with the cable axis CA particularly in a second embodiment in which the cable constraining configuration is the same as the fabrication configuration. In the second embodiment depicted in FIG. 5, the holding structure 105 may be configured on its outside similar to a well known grommet with an outside circumferential groove 131, which may be snapped into a clamping contour such as a mounting hole (not shown) as is well known in the art. The holding structure 105 may be initially fabricated in an injection molding process, followed by a second co-molding process where the gel 107 is applied. The flexible contact sheet 109 may be attached to the sheet attachment interface 113, 115 in a final fabrication stage. In case of the flexible contact sheet 109 being of rubber like material, it may be combined with the sheet attachment interface 113, 115 by a co-molding process as well. In case of the flexible contact sheet 109 including a fiber fabric material such as well known Kevlar™, the flexible contact sheet 109 may be glued or welded to the sheet attachment interface 113, 115. Due to the closed circular shape of the holding structure 105, the co-molding and other eventual fabrication steps are preferably performed in a direction substantially parallel to the cable axis CA. In the second embodiment, the holding structure 105 provides rough and static shape adjustment to the cable circumference 7 while the cushion(s) 117 defined by the gel 107 and the flexible contact sheet 109 provide balanced constraining pressure and dynamic damping of cable 1 micro movement and vibration.

Figure 6:
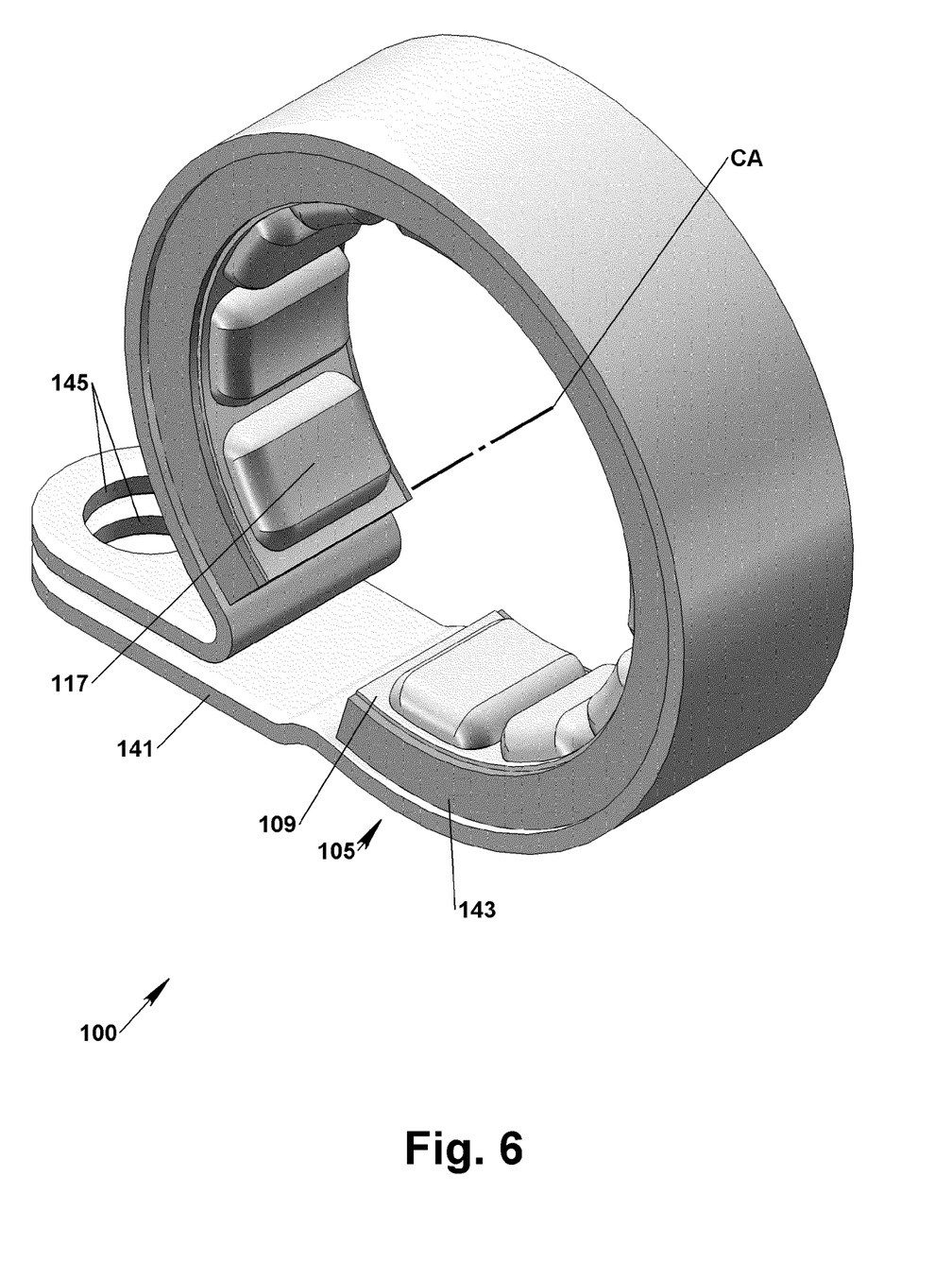
FIG. 6 is the second shaded perspective view of a third embodiment of the invention.
Figure 7:
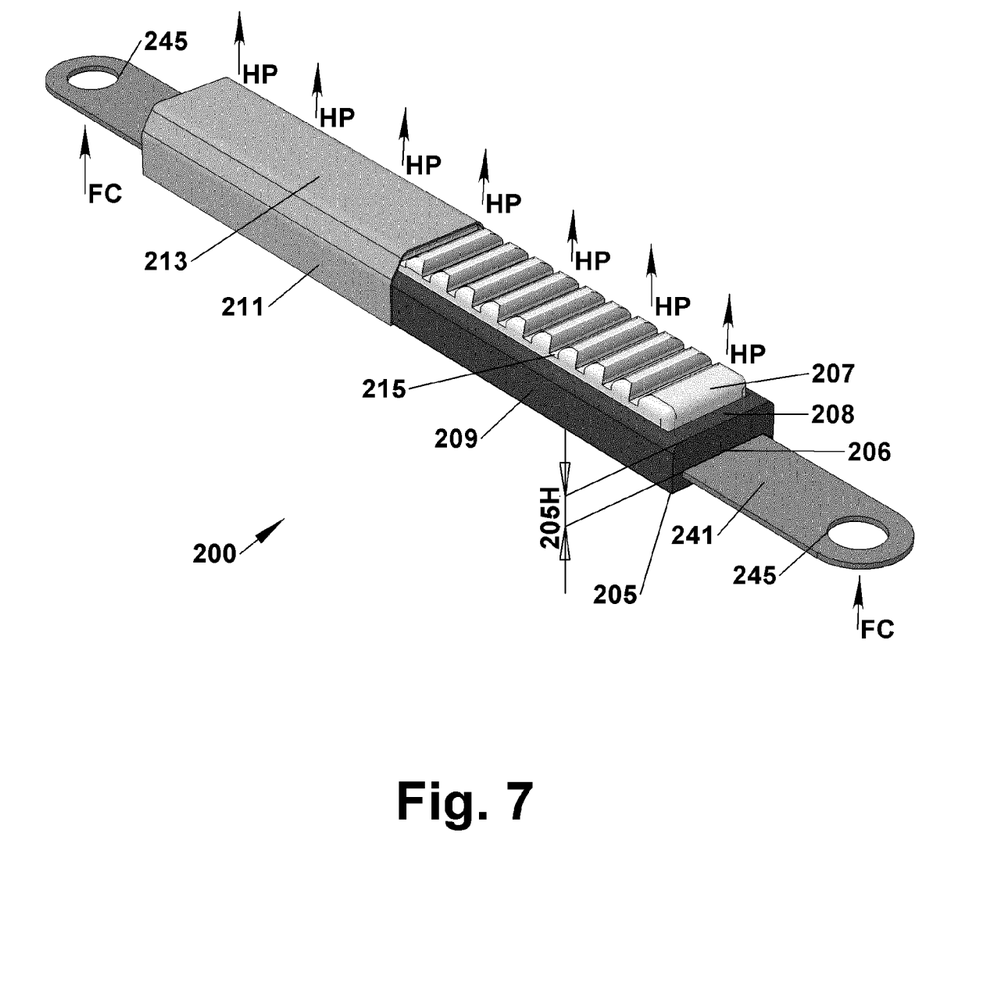
FIG. 7 is a third shaded perspective top view of a fourth embodiment of the invention in a first configuration.

Referring to FIG. 6 and a third embodiment of the invention, the positioning structure 105 may be configured as a circumferentially tight able cable clip similar for example to a well known P-clamp. In that case, part of the holding structure 105 may be an outer rigid clamping structure 141 configured and acting for example as a well known P-clamp. The outer rigid clamping structure 141 may also be configured as other well known cable clamping structures that are either once or twice circumferentially separated to provide the circumferential tightening as is well known in the art. In the third embodiment, an intermediate rubbery structure 143 that is combined with the outer rigid clamping structure 141 is also part of the holding structure 105. In the third embodiment, the outer rigid clamping structure 141 provides on one hand positioning stiffness and clamping firmness of the cable 1 while the intermediate rubbery structure 143 provides rough and static shape adjustment to the cable circumference 7 while the cushion(s) 117 defined by the gel 107 and the flexible contact sheet 109 provide balanced constraining pressure and dynamic damping of cable 1 micro movement and vibration. The outer rigid clamping structure 141 may have an attachment feature(s) 145 such as a well known screw hole 145 via which the cable constraining device 100 may be attached and circumferentially tightened.

In the third embodiment, the positioning structure 105 may be circumferentially discontinuous as shown in FIG. 6. Particularly in such case, the fabrication configuration of the holding structure 105 and/or the intermediate rubbery structure 143 may be straightened compared to its constraining configuration as depicted in the FIGS. 1-6. A straightened fabrication configuration in turn may provide more perpendicular access to the sheet attachment interface 113, 115, which gives more free fabrication access to the transverse seam(s) 115 and circumferential seams 113 as may be well appreciated by anyone skilled in the art. Consequently, the transverse seam(s) 115 may be in a substantial angle with respect to the cable axis CA, which may reduce eventual long term setting of the cable 1 in between two adjacent gel cushions 117. Also, the flexible contact sheet 109 may easily accessed for gluing, stitching, welding or co-molding to the sheet attachment interface 113, 115. The final fabrication profile of the positioning structure 105 and/or intermediate rubbery structure 143, the flexible contact sheet 109 and the gel 107 may be lengthened in conjunction with and attached inside any prefabricated cable 1 clamping contour in general and the outer rigid clamping structure 141 in particular. A cable 1 clamping contour may be for example a through hole.

In all embodiments, the flexible contact sheet 109, 211 may be of a rubber like material and/or a fiber fabric that may be woven and/or coated. The coating may also be rubber like material and/or a well known stiction coating to increase well known stiction between the flexible contact sheet 109 and the cable circumference 7. Increasing such stiction in the interface between cable circumference 7 and flexible contact sheet 109 may also reduce friction wear there. Use of the cable constraining device 100 is similar to conventional well known grommets and cable clips.

Referring to FIGS. 7-12, the cable constraining device 200 according to a fourth embodiment of the invention is configured as a multilayer profile including a clamping profile 241, a cushion profile 207, a position profile 205 and the flexible contact sheet 211. In FIGS. 7-11, the flexible contact sheet 211 is half removed for illustration purposes. The clamping profile 241 is preferably made of sheet metal but may be of any material and configuration to provide a clamping stiffness between the two clamping features 245 as may be well appreciated by anyone skilled in the art. The clamping profile 241 has two clamping features 245 at its longitudinal opposing ends. The two clamping features 245 may be preferably screw holes but may also be any other well known structural feature such as a hook or thread hole that may serve to receive a clamping force FC that is preferably in a substantial angle with respect to the clamping profile 241.

Figure 11:
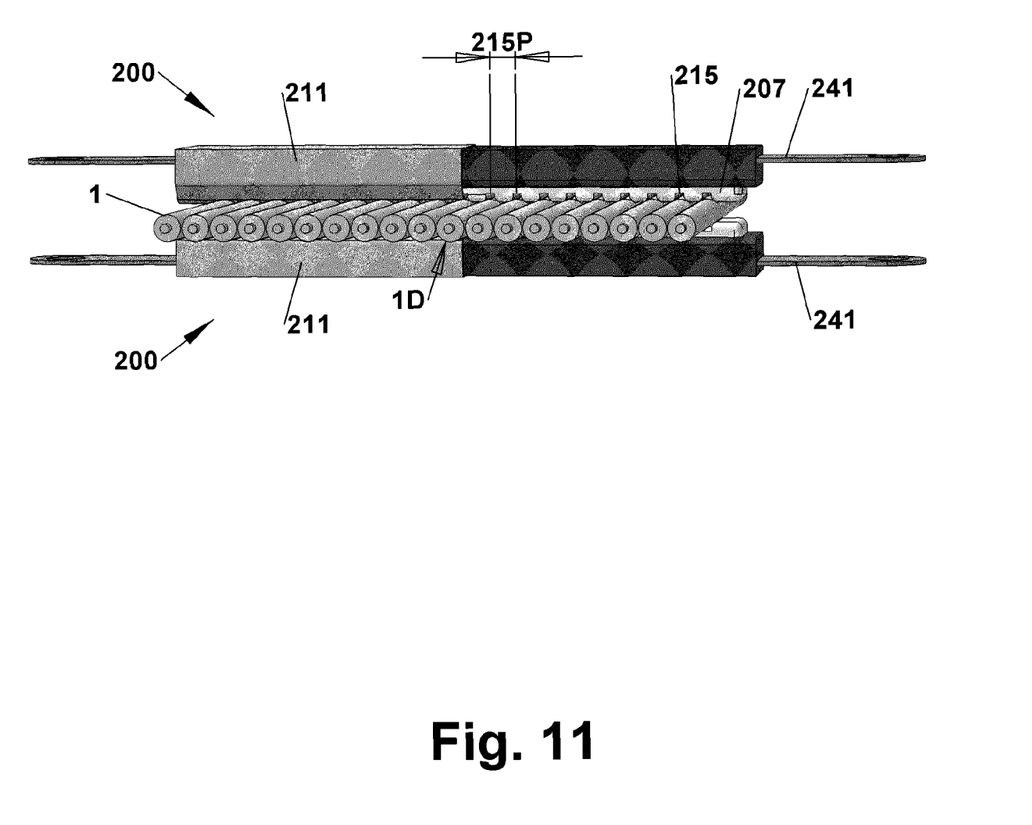
FIG. 11 is a perspective frontal view of the fourth embodiment of the invention in assembly position with clamped cables.
Figure 12:
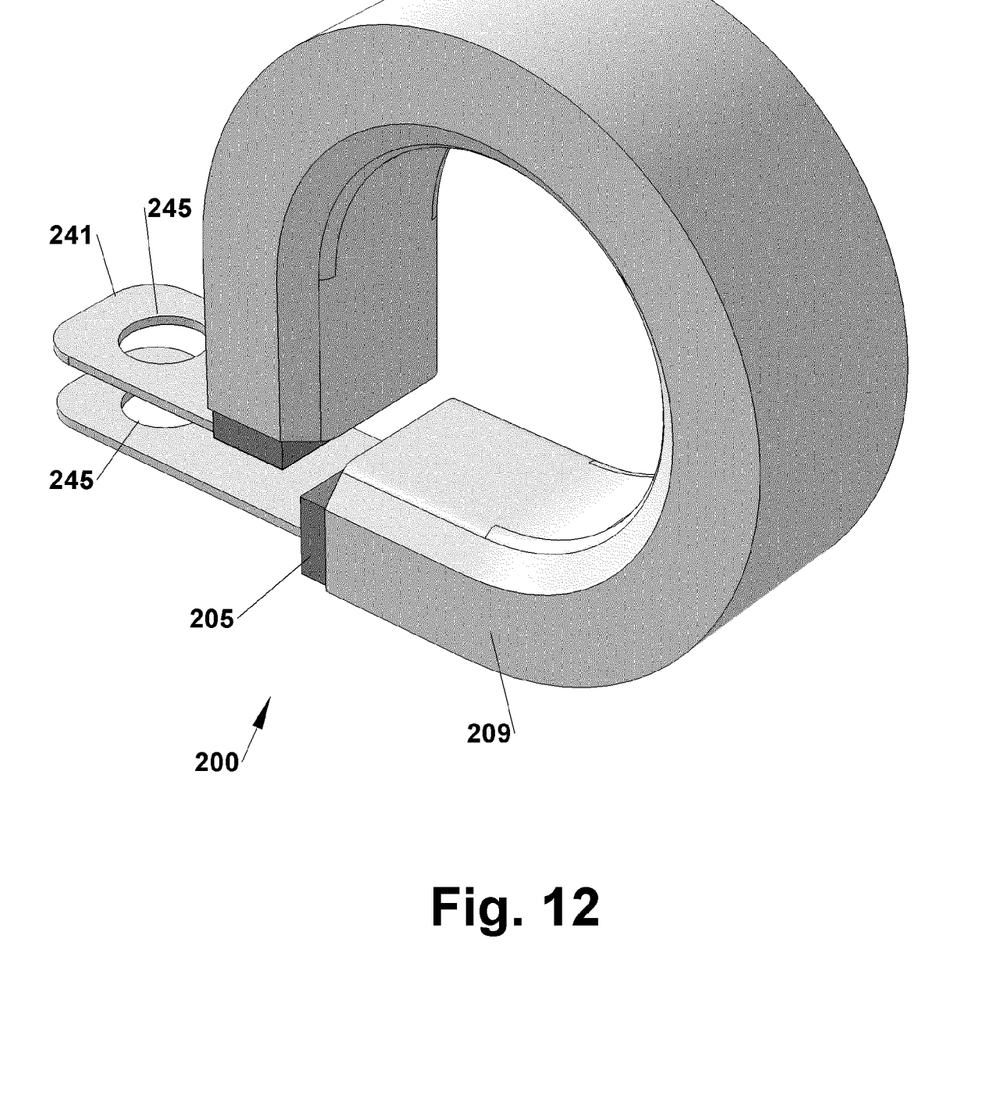
FIG. 12 is the second perspective view of the fourth embodiment in P-clamp bent configuration.

The cushion profile 207 extends adjacent to the clamping profile 241 and in between the two clamping features 245. The cushion profile 207 may have transverse peripheral grooves 215 that may one hand compensate for compression in case of bending the cable constraining multilayer profile as shown in FIG. 12. On the other hand, the transverse peripheral grooves 215 may assist in fixating cables 1 individually as shown in FIG. 11. In that case, the transverse peripheral grooves 215 may have a groove pitch 215P that may correspond to a predetermined cable clamping spacing. The cable clamping spacing may be for example about the cable diameter 10 of a clamped cable 1. The cushion profile 207 has an extension length preferably equal the extension length of the positioning profile 205. Nevertheless, the cushion profile 207 may have an extension length that is only a fraction of the extension of the positioning profile 205 of down to less than the groove pitch 215P. In that case, a number of cushion profiles 207 may be combined with the positioning profile 205.

The positioning profile 205 also extends in between the two clamping features 245 and combines the cushion profile 207 with the clamping profile 241. The positioning profile 205 has a cushion profile connecting face 208 along which the cushion profile 207 is attached, clamping profile connecting face(s) 206 along which the clamping profile 241 is attached, and peripheral faces 209 along at least a portion of which the flexible contact sheet 211 is withholding itself while peripherally encompassing the cushion profile 207. The positioning profile 205 has a positioning height 205H between the clamping profile 241 and the cushion profile 207 and is preferably of a rubber type material of a positioning softness. Position height 205H is selected in conjunction with the positioning softness and the clamping stiffness of the clamping profile 241 between the clamping features 245, such that the clamping force FC is distributed along the cushion profile 207 with a predetermined pressure distribution HP irrespective an elastic clamping deformation of the clamping profile 241 between the two clamping features 245 as may be well appreciated by anyone skilled in the art. The predetermined pressure distribution HP is preferably a substantially balanced pressure distribution HP such that each clamped cable 1 is clamped with the substantially the same clamping pressure.

The cushion profile 207 may be made substantially softer than the positioning profile 207 to operate as described for the gel 107. The cushion profile 207 may be made of a gel and/or a soft rubber type material. Positioning profile 205 and/or cushion profile 207 may be fabricated by well known extrusion techniques, in case of which the cushion connecting face 208 may be preferably constant in direction between the two clamping features 245.

Figure 8:
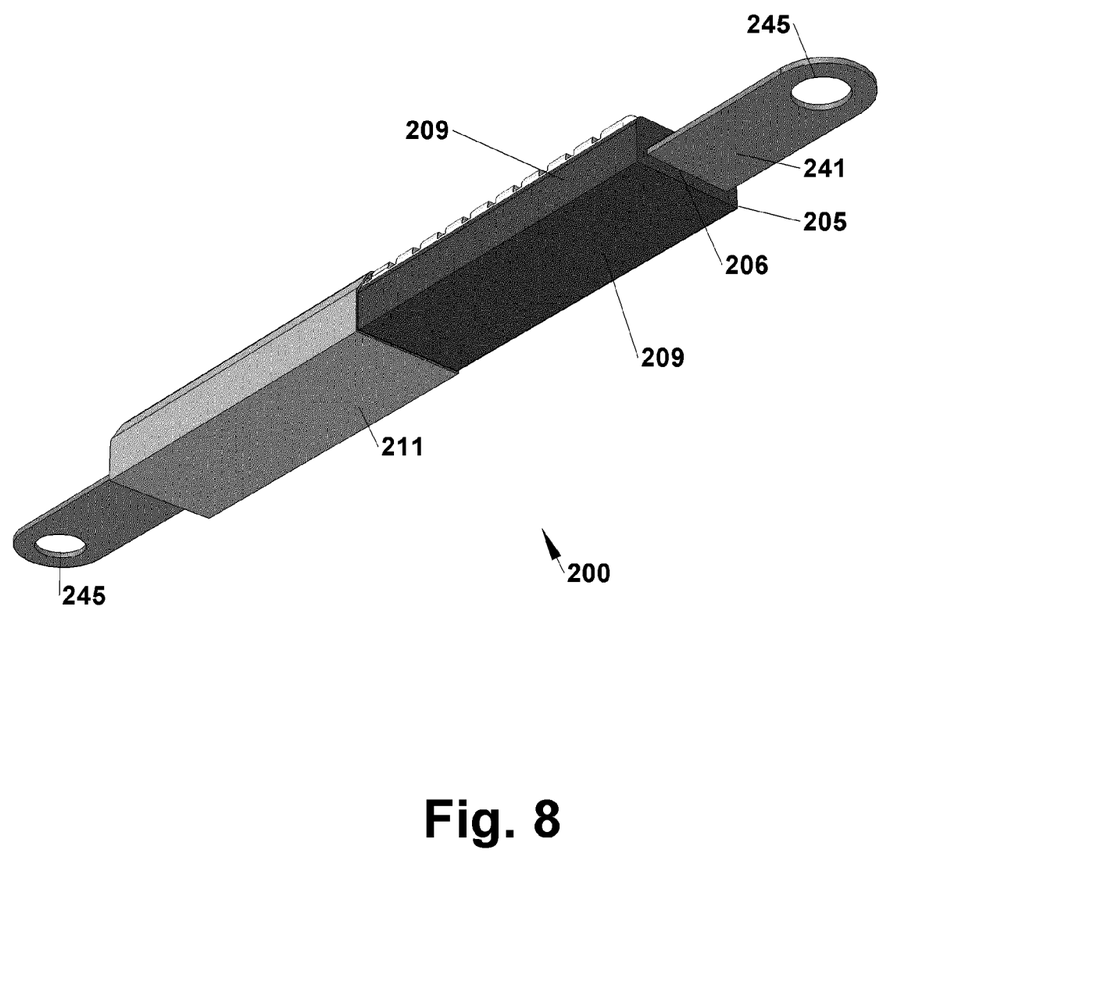
FIG. 8 is a fourth shaded perspective bottom view of the fourth embodiment of the invention in the first configuration.

As shown in FIG. 8, the clamping profile connecting face 206 may at least along a section but preferably entirely between the two clamping features 245 completely transversely encompass the clamping profile 241. In that first configuration, a most solid structural interlocking between the positioning profile 205 and the clamping profile 241 is accomplished. The flexible contact sheet 211 may be stretch tightened around the cushion profile 207 and the positioning profile 205. In this first configuration, the sub assembly including the cushion profile 207, the positioning profile 205 and the flexible contact sheet 211 may be substantially free of adhesive; since the stretch tightened flexible contact sheet 211 may hold the cushion profile 207 onto the positioning profile 205. This may advantageously provide for a wider selection of different materials to be combined in the subassembly. In addition, without adhesive bond the risk of bond fatigue failure is also eliminated.

Figure 9:
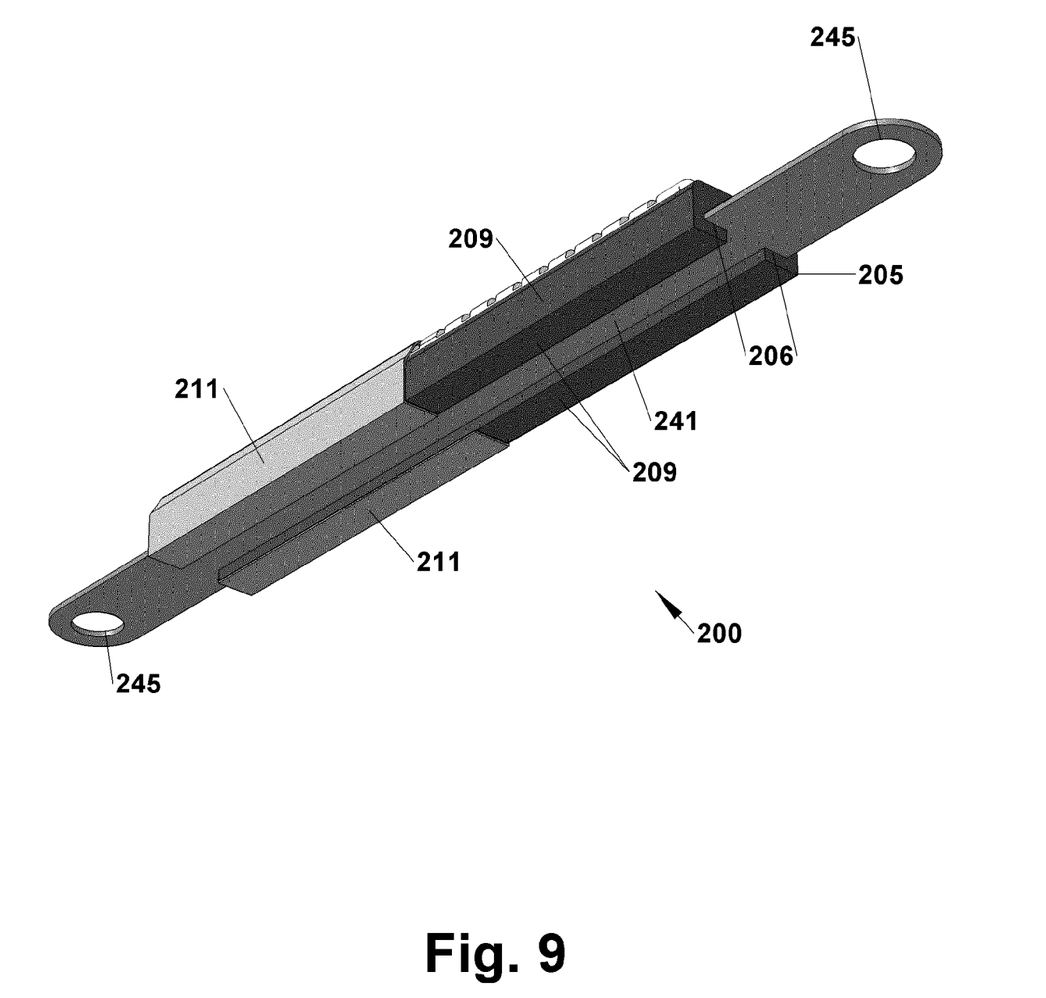
FIG. 9 is the fourth shaped perspective bottom view of the fourth embodiment of the invention in a second configuration.

In a second configuration shown in FIG. 9, the clamping profile connecting face 206 may be at least along a section but preferably entirely between the two clamping features 245 C-like transversely encompassing the clamping profile 241. This may be advantageous where the sub assembly needs to be snapped onto the clamping profile 241. The flexible contact sheet 211 may be adhesively bonded or otherwise connected to the peripheral faces 209 at the lateral sides relative to the cushion profile 207 and portions of the bottom side of the positioning profile 205 opposite the cushion profile 207.

Figure 10:
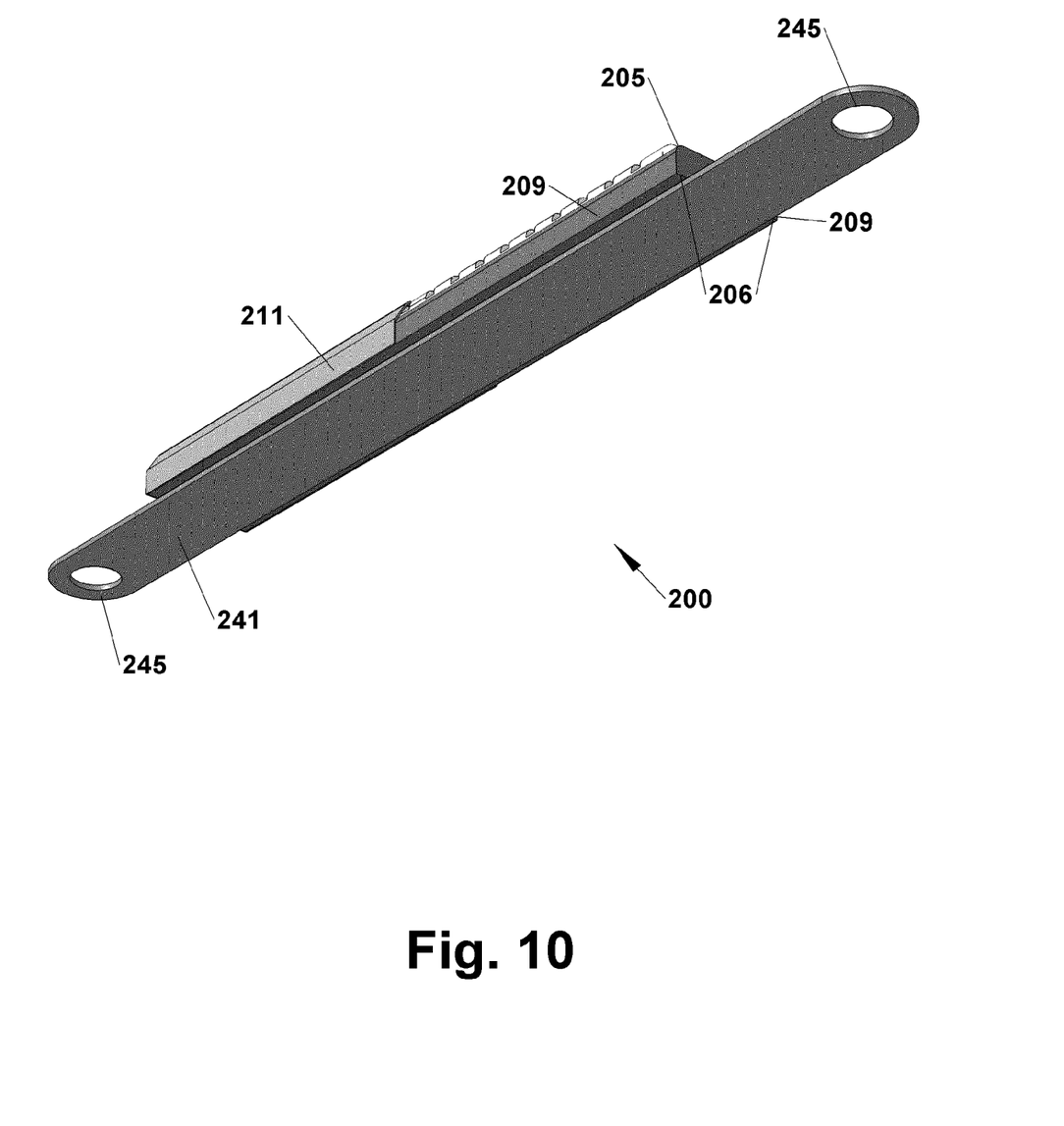
FIG. 10 is the fourth shaped perspective bottom view of the fourth embodiment of the invention in a third configuration.

In a third configuration shown in FIG. 10, the clamping profile connecting face 206 is at least along a section but preferably entirely between the two clamping features 245 single face adhesively combined with the clamping profile 241. This may be advantageous in cases where the clamping profile 241 with its bottom side opposite the cushion profile 207 is directly attached to another structure. The flexible contact sheet 211 is attached to the peripheral faces 209 on the lateral sides of said positioning profile 205.

Figure 13:
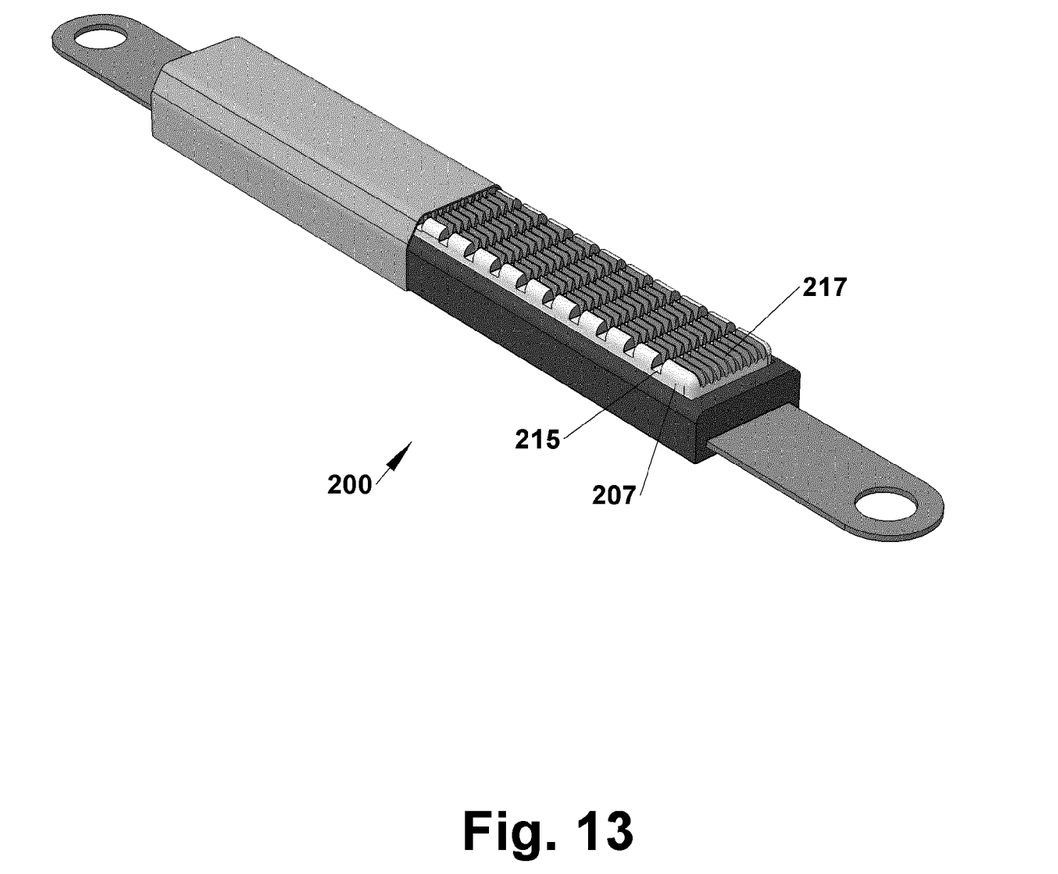
FIG. 13 is the third shaded perspective top view of the fourth embodiment of the invention in a fourth configuration.

The multilayer profile configuration of the cable clamp 200 provides for a simple adjustment in length and or bending contour of it. It may be for example easily bent into a P-clamp as depicted in FIG. 12. The flexible contact sheet 211 may again be of rubber material, or of nylon or Kevlar™ type fiber fabric with an eventual top stiction layer as described above. The positioning profile 205 and the cushion profile 207 may be a monolithically structure from either a single material or by comolding more than one separate materials. Referring to FIG. 13 and in case of single material monolithic structure, the cushion profile 207 may be defined by structural separations or indentations 217 with locally softening effect on the material as may be well appreciated by anyone skilled in the art.

Accordingly, the scope of the invention described in the Specification above and the Figures is set forth by the following claims and their legal equivalent:

What is claimed is:
1. A cable constraining multilayer profile comprising:
   A. a clamping profile having two clamping features at each of two longitudinal opposing ends of said clamping profile;
   B. a cushion profile extending adjacent to said clamping profile and in between said clamping features and
   C. a positioning profile extending in between said two clamping features and in between said cushion profile and said clamping profile, said positioning profile comprises:
      I. a cushion profile connecting face along which said cushion profile is attached to said positioning profile;
      II. a clamping profile connecting face along which said clamping profile is attached to said positioning profile;
      III. a peripheral face; and
   D. a flexible contact sheet peripherally encompassing said cushion profile and holding on at least a portion of said peripheral face; and
      wherein said positioning profile is at least along a section of said clamping profile connecting face adhesively combined with said clamping profile, and wherein said flexible contact sheet is attached to said peripheral face at a lateral side of said positioning profile.

2. The cable constraining multilayer profile of claim 1, wherein said clamping profile is a sheet metal profile and wherein at least one of said clamping features is a screw hole.

3. The cable constraining multilayer profile of claim 1, wherein said cushion profile is of soft rubber.

4. The cable constraining multilayer profile of claim 1, wherein said cushion profile is of a gel material.

5. The cable constraining multilayer profile of claim 1, wherein said clamping profile connecting face is at least along a section between said clamping features completely transversely encompassing said clamping profile.

6. The cable constraining multilayer profile of claim 5, wherein said flexible contact sheet is stretch tightened around said cushion profile and said positioning profile.

7. The cable constraining multilayer profile of claim 6 wherein a sub assembly of said cushion profile, said positioning profile and said flexible contact sheet is substantially without adhesive bond.

8. The cable constraining multilayer profile of claim 1, wherein said positioning profile is at least along a section between said two clamping features C-like transversely encompassing said clamping profile.

9. The cable constraining multilayer profile of claim 8, wherein said peripheral face is at lateral sides and a bottom side portion of said positioning profile.

10. The cable constraining multilayer profile of claim 1, wherein said positioning profile is made of rubber.

11. The cable constraining multilayer profile of claim 1 comprising a P-clamp bent shape.

12. The cable constraining multilayer profile of claim 1, wherein said flexible contact sheet is a fiber fabric.

13. The cable constraining multilayer profile of claim 12, wherein said fiber fabric is a nylon type material.

14. A cable constraining multilayer profile comprising:
  A. a clamping profile having two clamping features at each of two longitudinal opposing ends of said clamping profile;
  B. a cushion profile extending adjacent to said clamping profile and in between said clamping features and
  C. a positioning profile extending in between said two clamping features and in between said cushion profile and said clamping profile, said positioning profile comprises:
    I. a cushion profile connecting face along which said cushion profile is attached to said positioning profile;
    II. a clamping profile connecting face along which said clamping profile is attached to said positioning profile;
    III. a peripheral face; and
  D. a flexible contact sheet peripherally encompassing said cushion profile and holding on at least a portion of said peripheral face; and wherein said flexible contact sheet comprises a stiction layer and wherein said positioning profile is at least along a section of said clamping profile connecting face adhesively combined with said clamping profile, and wherein said flexible contact sheet is attached to said peripheral face at a lateral side of said positioning profile.

15. The cable constraining multilayer profile of claim 1, wherein said flexible contact sheet is made of rubber material.

16. The cable constraining multilayer profile of claim 1, wherein said positioning profile and said cushion profile are a monolithic structure.

17. A cable constraining multilayer profile comprising:
  A. a clamping profile having two clamping features at each of two longitudinal opposing ends of said clamping profile;
  B. a cushion profile extending adjacent to said clamping profile and in between said clamping features and
  C. a positioning profile extending in between said two clamping features and in between said cushion profile and said clamping profile, said positioning profile comprises:
    I. a cushion profile connecting face along which said cushion profile is attached to said positioning profile;
    II. a clamping profile connecting face along which said clamping profile is attached to said positioning profile;
    III. a peripheral face; and
  D. a flexible contact sheet peripherally encompassing said cushion profile and holding itself on at least a portion of said peripheral face;
  wherein said positioning profile and said cushion profile are a monolithic structure; and
  wherein said cushion profile is defined by material softening indentations with locally softening effect on said monolithic structure and
  wherein said positioning profile is at least along a section of said clamping profile connecting face adhesively combined with said clamping profile, and wherein said flexible contact sheet is attached to said peripheral face at a lateral side of said positioning profile.

18. The cable constraining multilayer profile of claim 1, wherein said cushion profile has an extension length that is a fraction of the extension of said positioning profile.

\* \* \* \* \*